US007227653B2

(12) United States Patent
Uchida

(10) Patent No.: US 7,227,653 B2
(45) Date of Patent: Jun. 5, 2007

(54) IMAGE FORMING APPARATUS FOR ERASING IMAGE DATA STORED IN MEMORY

(75) Inventor: Sachi Uchida, Yamato (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 71 days.

(21) Appl. No.: 11/115,260

(22) Filed: Apr. 27, 2005

(65) Prior Publication Data

US 2005/0185210 A1 Aug. 25, 2005

Related U.S. Application Data

(63) Continuation of application No. 09/366,961, filed on Aug. 4, 1999, now Pat. No. 6,914,690.

(30) Foreign Application Priority Data

Aug. 5, 1998 (JP) ................................ 10-221805

(51) Int. Cl.
*G06F 15/00* (2006.01)
*G06K 1/00* (2006.01)

(52) U.S. Cl. .................. 358/1.14; 358/1.15; 358/1.16; 358/404; 358/437

(58) Field of Classification Search ............... 358/1.15, 358/1.14, 1.16, 1.12, 404, 437, 434; 710/48, 710/260; 399/87
See application file for complete search history.

(56) References Cited

U.S. PATENT DOCUMENTS 4,275,958 A * 6/1981 Tachika et al. ............... 399/82
5,023,728 A 6/1991 Nimura et al.
5,499,101 A 3/1996 Watanabe
5,528,374 A * 6/1996 Matias ........................ 358/296
5,587,801 A 12/1996 Kamei et al.
5,710,956 A 1/1998 Kurohata et al.
5,724,490 A 3/1998 Shibaki et al.
5,740,497 A 4/1998 Yamada et al.

(Continued)

FOREIGN PATENT DOCUMENTS

JP 1-194653 A 8/1989

(Continued)

*Primary Examiner*—Aung Moe
*Assistant Examiner*—Dillon Murphy
(74) *Attorney, Agent, or Firm*—Foley & Lardner LLP

(57) ABSTRACT

A system CPU sets a storage area in a page memory when a copying operation has been started. Where a clear/stop key, etc. is depressed to suspend the copying operation, the system CPU checks whether there is data in the page memory. If there is data in the page memory, the system CPU displays a selection screen on a message display section for selection as to whether the data in the page memory should be retained or released. Where "HOLD" is determined, the system CPU performs re-scanning and stores data in the page memory at the time the setting has been changed and the copying operation has been resumed. On the other hand, where "RELEASE" is determined, the system CPU releases the data in the page memory and performs re-scanning and stores data in the page memory at the time the setting has been changed and the copying operation has been resumed. Finally, the printing of the data in the page memory is resumed by a printer.

9 Claims, 11 Drawing Sheets

U.S. PATENT DOCUMENTS

| | | | |
|---|---|---|---|
| 6,052,201 | A | 4/2000 | Shibaki et al. |
| 6,437,874 | B1 | 8/2002 | Shibaki et al. |

FOREIGN PATENT DOCUMENTS

| | | | |
|---|---|---|---|
| JP | 05-077525 | A | 3/1993 |
| JP | 06-149494 | A | 5/1994 |
| JP | 7-58902 | A | 3/1995 |
| JP | 7-175606 | A | 7/1995 |
| JP | 09-046490 | A | 2/1997 |
| JP | 09-163088 | A | 6/1997 |
| JP | 11-45031 | A | 2/1999 |

* cited by examiner

IMAGE FORMING APPARATUS FOR ERASING IMAGE DATA STORED IN MEMORY

The present application is a continuation of U.S. application Ser. No. 09/366,961, filed Aug. 4, 1999, now U.S. Pat. No. 6,914,690, the entire contents of which are incorporated herein by reference, which in turn claims priority of Japanese patent application 10-221805, filed Aug. 5, 1998.

BACKGROUND OF THE INVENTION

The present invention relates to an image forming apparatus such as a digital copying machine, wherein an image on a document is read and subjected to an image process, obtained image data is accumulated on a memory, and an image is formed by using a laser electrophotographic process.

A digital copying machine has the following structures and functions. After a document is read by optical means, the read image is converted to an electric signal and subjected to various image processing. Then, image data is accumulated on a memory or processed, and the image is reproduced from the data by using a laser electrophotographic process.

Since the digital copying machine has the above structures and functions, the following applications are possible, in addition to the copying functions of a conventional analog copying machine. For example, the digital copying machine may be connected to a public line to perform facsimile functions. Specifically, it may transmit images to the public line or may receive images from the public line to print out them. Moreover, the digital copying machine may be provided with image communication means for communication with a host computer, whereby print data is received and printed out by using a single laser electrophotographic process (laser engine).

In an image forming process in the digital copying machine, after a document is read by optical means, an optical signal of the read image is converted to an electric signal by using a photoelectric conversion element such as a CCD. The electric signal is subjected to various image processes, such as an analog/digital conversion process, linear/non-linear filtering processes, a frequency conversion process using a line memory for a one-line image component, an enlargement/reduction process, and a gray-scale process. The image is them reproduced from the obtained data by using a laser electrophotographic process.

Furthermore, using the features the digital copying machine, the following functions can be performed. For example, a memory copy function is performed, wherein the processed image signal is stored in a two-dimensional memory (page memory) for a one-page image and the content of the memory is repeatedly read out and printed. An electronic sorting function is performed, wherein the image signals stored in the page memory are encoded into data files to treat images as files, and the images may be reproduced from the data files in a changed order. A memory editing function is performed, wherein files are freely edited.

As has been described above, since the digital copying machine can temporarily store images in the memory, it can perform various image editing operations which cannot be achieved by the conventional analog copying machine. Using the functions which cannot be performed by the analog machine, the digital copying machine can efficiently use various paper handling options (an automatic sheet feeder, an automatic double-side printer, a sorter/finisher, etc.).

In the above-described memory copy function, a so-called "advance-input" can be performed by using the page memory, thereby to greatly enhance productivity.

In the memory copy function, however, scanning and printing are not performed in a completely synchronous manner. Even if the user suspends a current job and performs some operation/resetting, this is not reflected on the "advance-input" image. In some cases, operability is considerably degraded, compared to the conventional analog copying machine wherein the user can smoothly perform the operational routine of starting, suspending, operating, changing of setting, and restarting.

In order to solve this problem, there is a method in which prior to the operations of suspending/restarting, data in the page memory is always erased and scanning is done once again with updated setting. However, when some change is made during the suspension, there are cases where the operation should and should not be resumed, with the data in the page memory maintained without erasing. For example, in a case where only the number of documents to be placed is changed after C/S suspension, the printing has to be resumed with use of the data remaining in the page memory.

BRIEF SUMMARY OF THE INVENTION

The object of the present invention is to provide an image forming apparatus capable of enhancing operability after suspension of a memory copy function.

According to an aspect of the present invention, there is provided an image forming apparatus, wherein image data of a document is read, the read image data is stored in memory means, and the stored image data is used to form an image, the apparatus comprising:

interrupt means for interrupting a series of image forming operations beginning with reading of an image of the document and ending with completion of formation of an image;

discrimination means for determining, where image data is stored in the memory means, whether the image data is to be retained or erased, when the image forming operations have been interrupted by the interrupt means;

first control means for retaining, when the retention of the image data has been determined by the discrimination means, the image data stored in the memory means and, after the interrupted image formation operations are resumed, performing an image forming control with use of the retained image data; and second control means for erasing, when the erasure of the image data has been determined by the discrimination means, the image data stored in the memory means and, after the interrupted image formation operations are resumed, reading image data of the document, storing the read image data in the memory means and performing an image forming control with use of the stored image data.

According to another aspect of the invention, there is provided an image forming apparatus, wherein image data of a document is read, the read image data is stored in memory means, and the stored image data is used to form an image, the apparatus comprising:

interrupt means for interrupting a series of image forming operations beginning with reading of an image of the document and ending with completion of formation of an image;

display means for showing, where image data is present in the memory means, that the image data is present in the memory means, when the image forming operations have been interrupted by the interrupt means;

first control means for retaining, when the retention of the image data displayed on the display means has been determined, the image data present in the memory means and performing an image forming control with use of the retained image data; and second control means for erasing, when the erasure of the image data displayed on the display means has been determined, the image data stored in the memory means and, after the interrupted image formation operations are resumed, reading image data of the document, storing the read image data in the memory means and performing an image forming control with use of the stored image data.

According to still another aspect of the invention, there is provided an image forming apparatus, wherein image data of a document is read, the read image data is stored in memory means, and the stored image data is used to form an image, the apparatus comprising:

interrupt means for interrupting a series of image forming operations beginning with reading of an image of the document and ending with completion of formation of an image; and control means for performing, where image data is stored in the memory means, a control as to whether the image data is to be retained or erased, when the image forming operations have been interrupted by the interrupt means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to the accompanying drawings.

Figure 1:
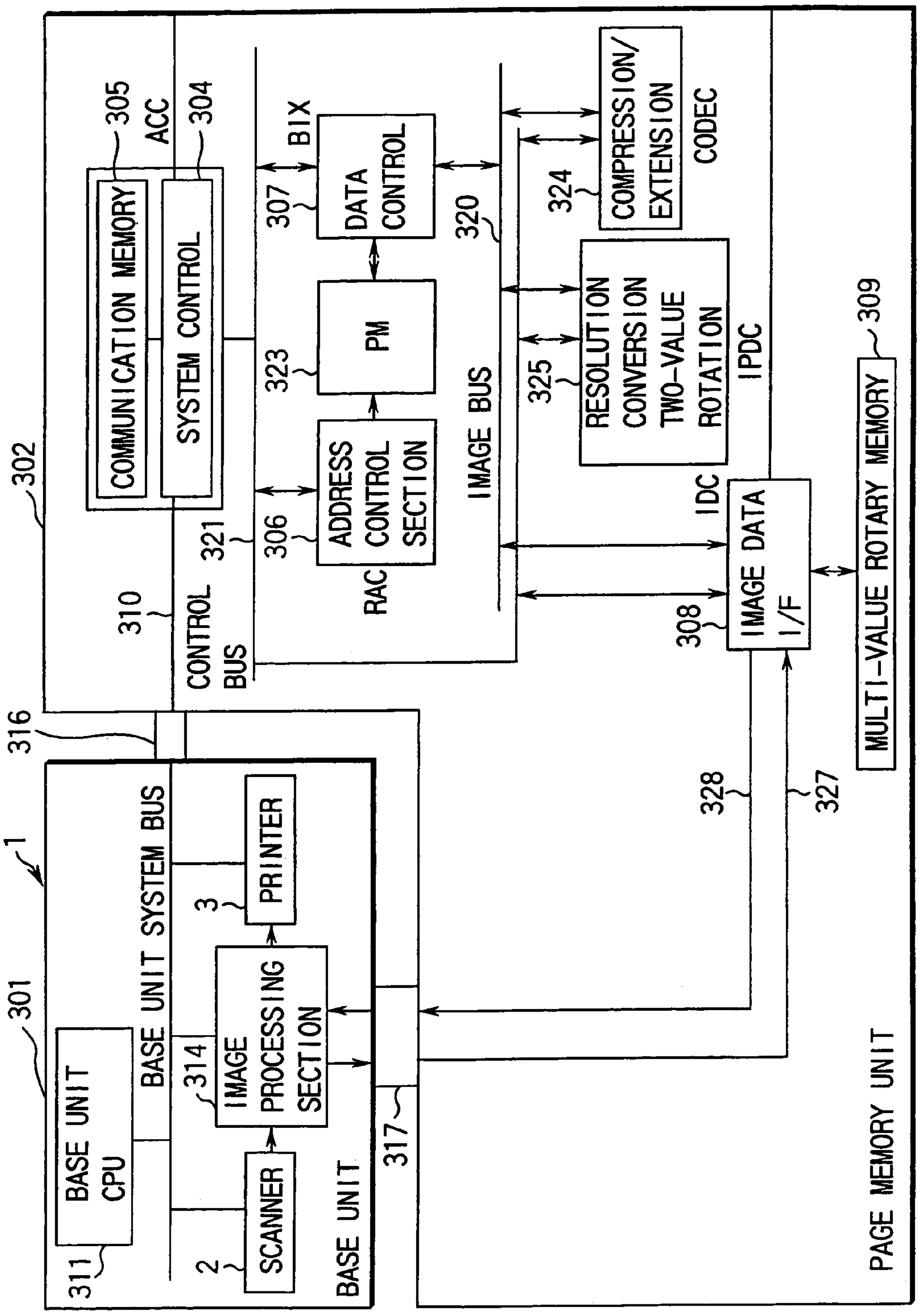
FIG. 1 is a block diagram schematically showing an entire structure of a digital copying machine serving as an image forming apparatus according to the present invention.
Figure 2:
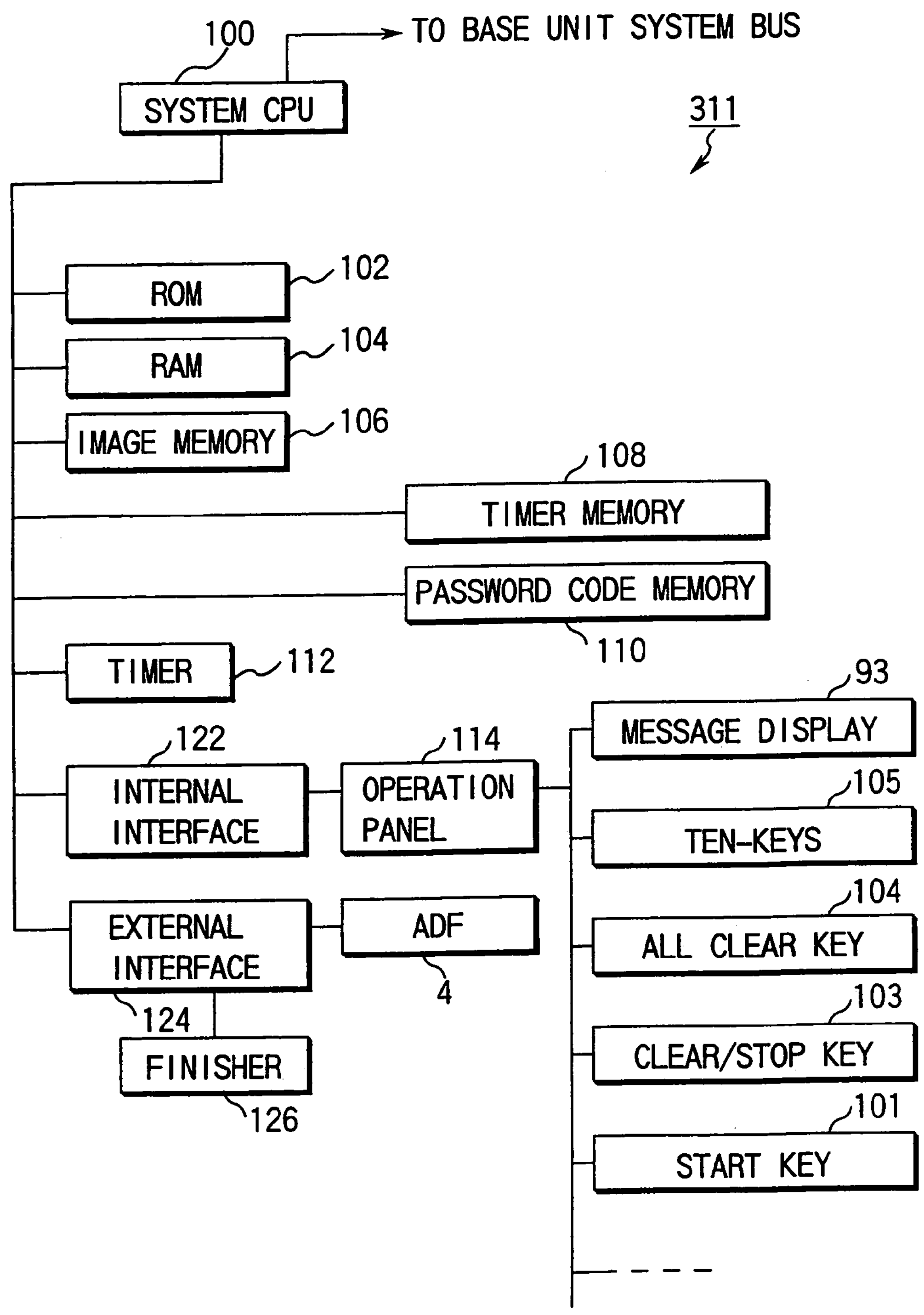
FIG. 2 is a block diagram schematically showing an entire structure of a digital copying machine serving as an image forming apparatus according to the present invention.

FIGS. 1 and 2 schematically show the entire structure of a digital copying machine 1 functioning as an image forming apparatus according to the present invention. The digital copying machine 1 includes a scanner 2 and a printer 3 and it has an automatic document feeder (ADF) 4 on an upper part of the machine body.

The digital copying machine 1 generally comprises two blocks, i.e. a base unit 301 and a page memory unit 302. The base unit 301 has an image processing section 314 connecting the scanner and the printer 3 and constitutes the digital copying machine 1. The page memory unit 302 functions as storage means for storing image data received from the base unit 301 and transferring the stored image data to the base unit 301 once again, thereby achieving a memory copying function.

The base unit 301 and page memory unit 302 are connected by a base unit system interface 316 for transmission of control data and a base unit image interface 317 for transmission of image data.

The base unit 301 comprises the scanner 2 serving as input means, the printer 3 serving as output means, image processing means (image processing section) 314, and control means (base unit CPU) 311 for controlling these structural elements.

As is shown in FIG. 2, a system CPU 100 in the control means (base unit CPU) 311 is connected to a ROM 102, a RAM 104, an image memory 106, a timer memory 108, a password code memory 110, a timer 112, an internal interface 122 and an external interface 124.

The internal interface 122 is connected to an operation panel 114, and the external interface 124 is connected to the automatic document feeder (ADF) 4 and a finisher 126. A message display 93, a start key 101, ten-keys 105, etc. are disposed on the operation panel 114.

The page memory unit 302 will now be described with reference to FIG. 1. The page memory unit 302 comprises the following elements: system control means 304 which controls access to a page memory 323 and includes a communication memory 305; storage means (PM: page memory) 323 for temporarily storing image data; an address control section 306 for generating addresses in the page memory 323; an image bus 320 for data transfer among devices in the page memory unit 302; a control bus 321 for transferring control signals between each device in the page memory section 302 and the system control means 304; data control means 307 for controlling data transfer via the image bus 320 between the page memory 323 and other devices; image data I/F means 308 serving as an interface for image data transferred to the base unit 301 via the base unit image interface 317; resolution conversion/two-value rotary means 325 for converting a resolution of image data to resolutions of other devices at the time of transmitting the image data to devices with different resolutions, converting a resolution of image data received from other devices with different resolutions to a resolution of the printer 3 of the base unit 301, or executing a 90° rotary process of two-value image data; compression/extension means 324 for compressing input image data for devices which transmit or store compressed image data, as in cases of facsimile transmission and optical disk storage, and extending compressed image data for visible printing; and a multi-value rotary memory 309, connected to the image data I/F means 308, for rotating image data over 90° or −90° to be output from the printer 3.

Figure 3:
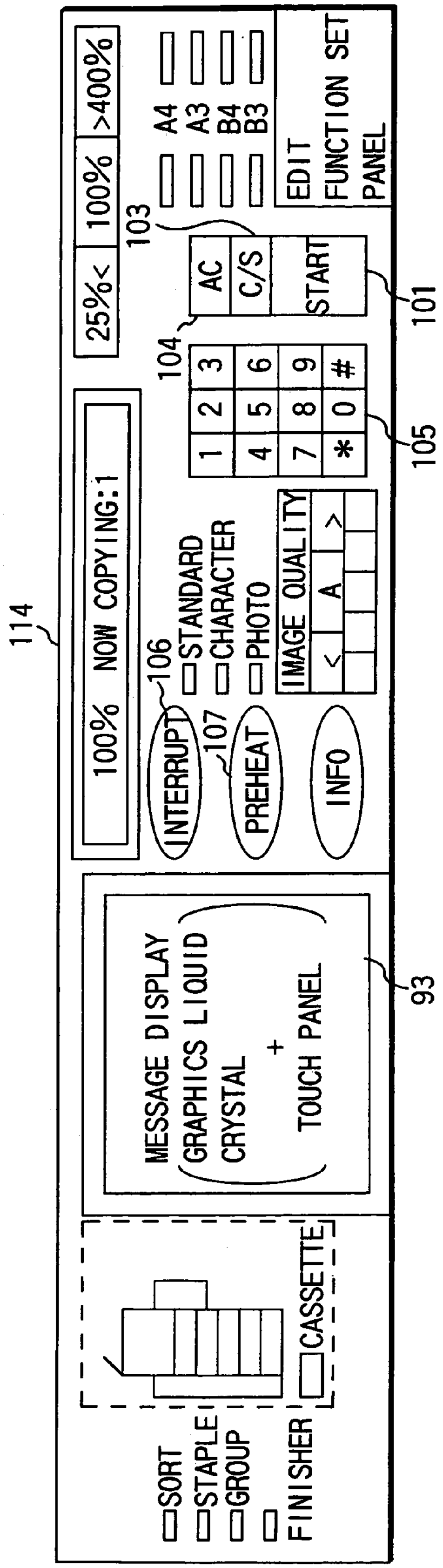
FIG. 3 shows a structure of an operation panel.

FIG. 3 shows an example of the structure of the operation panel 114. Specifically, the operation panel 114 includes a message display 93, which comprises a graphics liquid crystal and a touch panel, a start key 101, a clear/stop key 103, an all-clear key 104, ten-keys 105, an interrupt key 106, a preheat key 107, etc.

Figure 4:
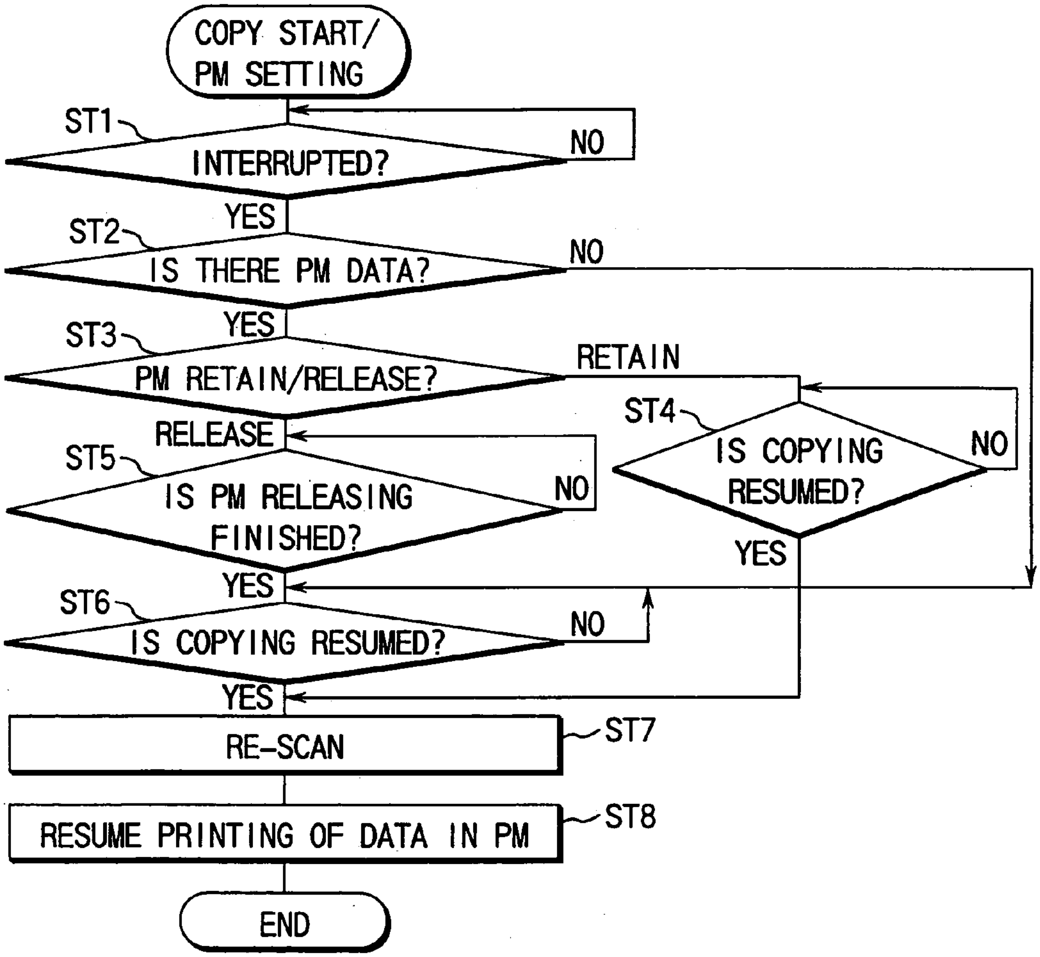
FIG. 4 is a flow chart illustrating a control operation of a digital copying machine to which the present invention is applied.

The control operation of the digital copying machine 1 with the above structure, to which the present invention is applied, will now be described with reference to a flow chart of FIG. 4.

A copying operation is started and a storage area is set in the page memory 323.

When the copying operation has been suspended by the clear/stop key 103, etc. (ST1), the system CPU 100 checks whether there is data in the page memory 323 (ST2). If there is no data, the control-goes to step ST6.

If there is data in the page memory 323, the system CPU 100 causes the message display 93 to display a selection screen for the user to select the holding or releasing of the data in the page memory 323 (ST3).

Upon an operation by the user, the system CPU 100 discriminates the retention/release of image data. If the system CPU 100 determines the retention of image data, the control goes to step ST7 at the time the setting has been changed and the copying operation resumed (ST4). If the system CPU 100 determines the release of image data, the system CPU 100 releases (erases) data in the page memory 323 (ST5) and shifts control to step ST7 at the time the setting has been changed and the copying operation resumed (ST6).

Since the copying operation is resumed, the system CPU 100 performs re-scanning by means of the scanner 2 and stores data in the page memory 323 (ST7). If there is data held in step ST3, the data in the page memory 323 including such data is printed out by the printer 3 (ST8).

Figure 5:
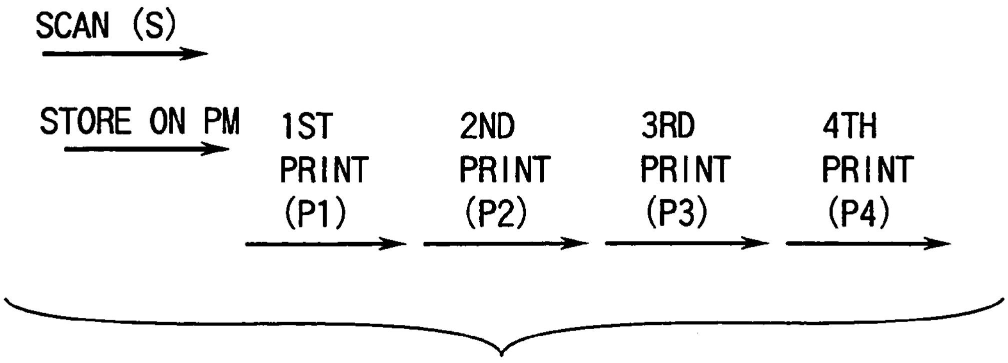
FIG. 5 illustrates an example of a memory copying operation when one page memory is used.

FIG. 5 shows an example of a memory copying operation when one page buffer is used in a case where four copies of one document are to be made. The system CPU 100 scans the document by the scanner 2 and accumulates the scan data in the page memory (PM) 323. The system CPU 100 reads out data from the page memory 323 to print the first, second, third and fourth copies of the document by means of the printer 3.

Figure 6:
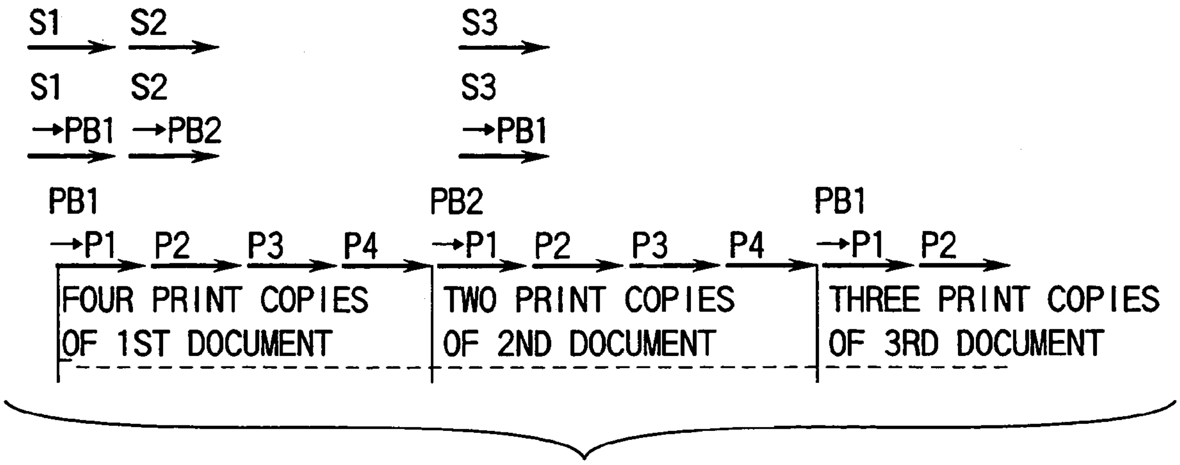
FIG. 6 illustrates an example of a memory copying operation when a plurality of page memories are used.

FIG. 6 shows an example of the memory copying operation when a plurality of page buffers are used in a case where four copies of each of three documents are to be made. Two areas (double buffer) PB1 and PB2 are provided in a storage area of the page memory 323, and image data corresponding in amount to one document is stored in each of the areas PB1 and PB2.

The system CPU 100 scans the first document on the ADF 4 by means of the scanner 2 (S1) and accumulates the scan data in the area PB1 in the page memory 323. Then, the system CPU 100 scans the second document on the ADF 4 by means of the scanner 2 (S2) and accumulates the scan data in the area PB2 in the page memory 323. By reading out the data on the first document from the area PB1 in the page memory 323, four copies of the first document are printed by means of the printer 3.

After the four copies of the first document have been printed, the system CPU 100 reads out the data on the second document from the area PB2 in the page memory 323 and starts to print four copies of the second document by means of the printer 3. At the same time, the third document on the ADF 4 is scanned by the scanner 2 (S3) and the scan data is accumulated in the area PB1 in the page memory 323. In this manner, after the area PB1 in the page memory 323 is cleared, the data on the third document is read in.

After the four copies of the second document data have been printed, the data on the third document stored in the area PB1 of the page memory 323 is read out and four copies thereof are printed.

Figure 7:
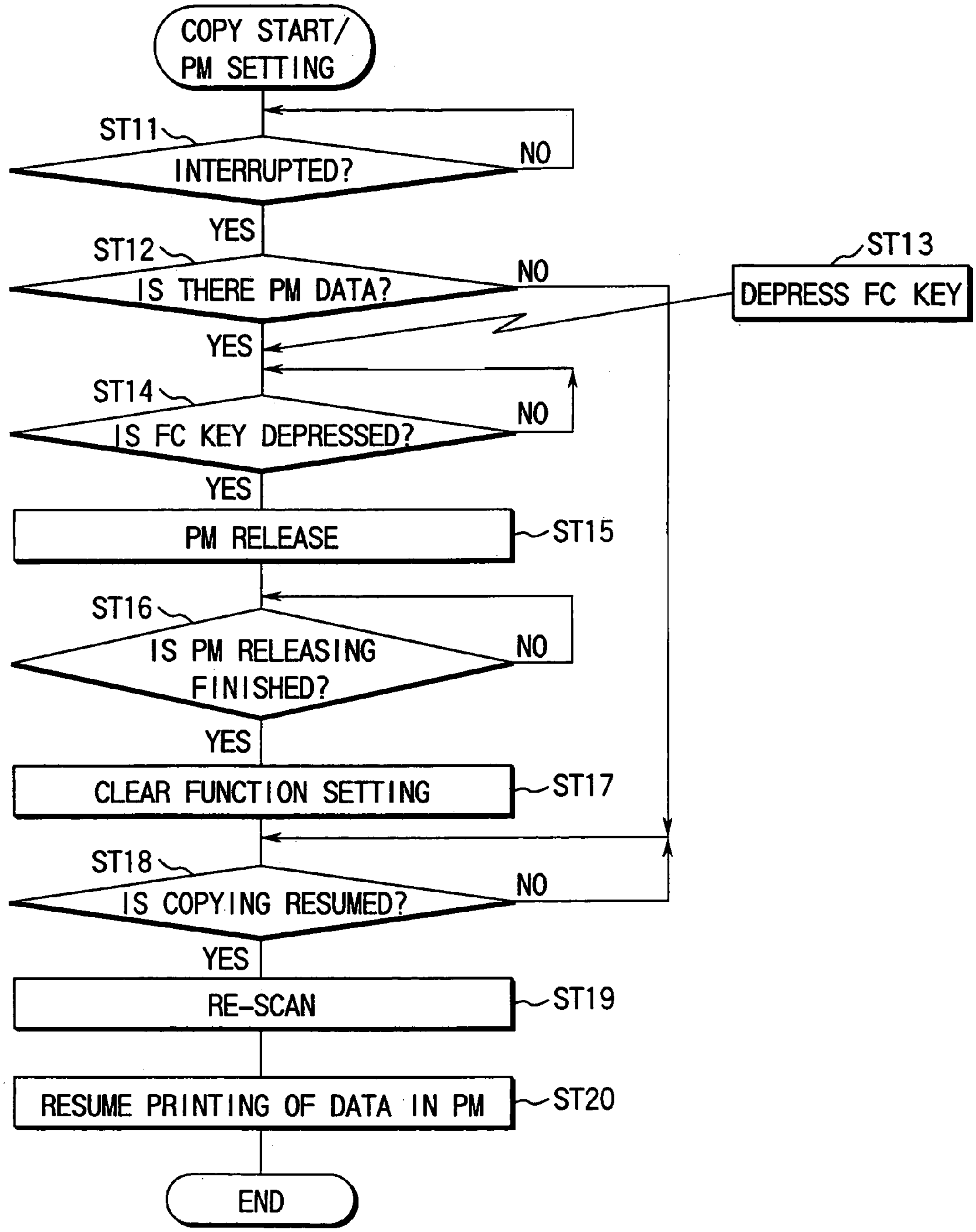
FIG. 7 is a flow chart illustrating a control operation in a case where a function clear key has been depressed.

A control operation in a case where a function clear key of the digital copying machine 1 has been depressed will now be described with reference to a flow chart of FIG. 7.

A copying operation is started and a storage area is set in the page memory 323.

When the clear/stop key 103 has been depressed (ST11), the system CPU 100 checks whether there is data in the page memory 323 (ST12). If there is no data, the control goes to step ST18.

If there is data in the page memory 323, the system CPU 100 releases the data in the page memory 323 (ST15, ST16) and clears the set function (ST17) when the function key (FC) displayed on the message display 93 has been depressed (ST13, ST14).

If the copying operation is resumed (ST18), the system CPU 100 performs re-scanning by means of the scanner 2 and stores data in the page memory 323 (ST19) and resumes the printing of the data in the page memory 323 (ST20).

Figure 8:
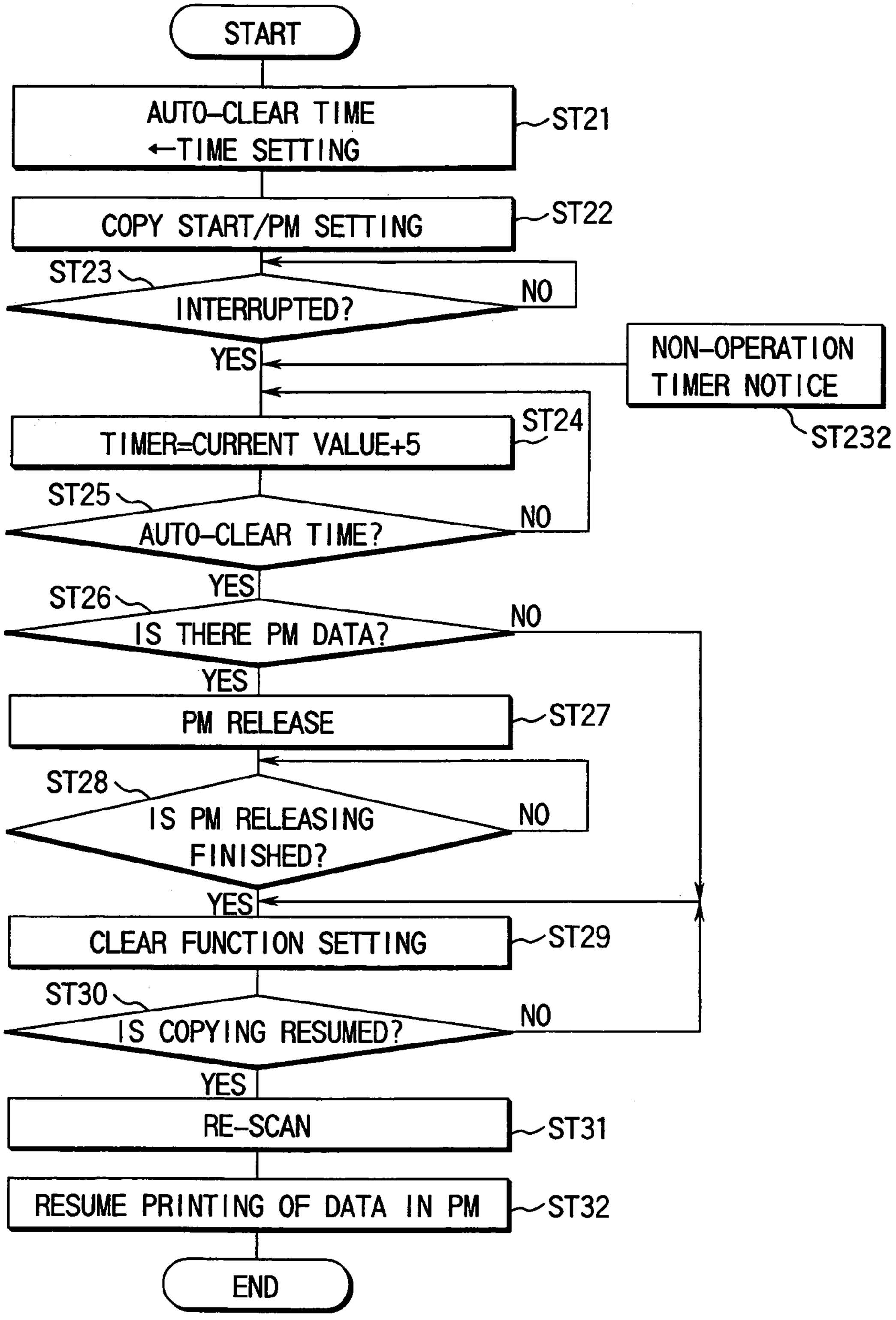
FIG. 8 is a flow chart illustrating a control operation in a case where an auto-clear timer has operated.

A control operation in a case where an auto-clear timer in the digital copying machine 1 has operated will now be described with reference to a flow chart of FIG. 8.

An auto-clear time is set in the timer memory 108 (ST21).

The system CPU 100 starts the copying operation and sets a storage area in the page memory 323 (ST22). If the copying operation is suspended by the clear/stop key 103, etc. (ST23), the timer 112 is notified without operation (ST232). For example, at a time of a current value+5 (ST24), the timer 112 checks whether an auto-clear time set in the timer memory 108 has passed (ST25).

If the timer 112 determines that the auto-clear time has passed, the system CPU 100 checks whether there is data in the page-memory 323 (ST26). If there is no data, the control goes to step ST29.

If there is data in the page memory 323, the system CPU 100 releases the data in the page memory 323 (ST27, ST28) and clears the set function (ST29).

When the copying operation has been resumed (ST30), the system CPU 100 causes the scanner 2 to perform re-scanning and stores data in the page memory 323 (ST31) and resumes the printing of data in the page memory 323 by means of the printer 3 (ST32).

Figure 9:
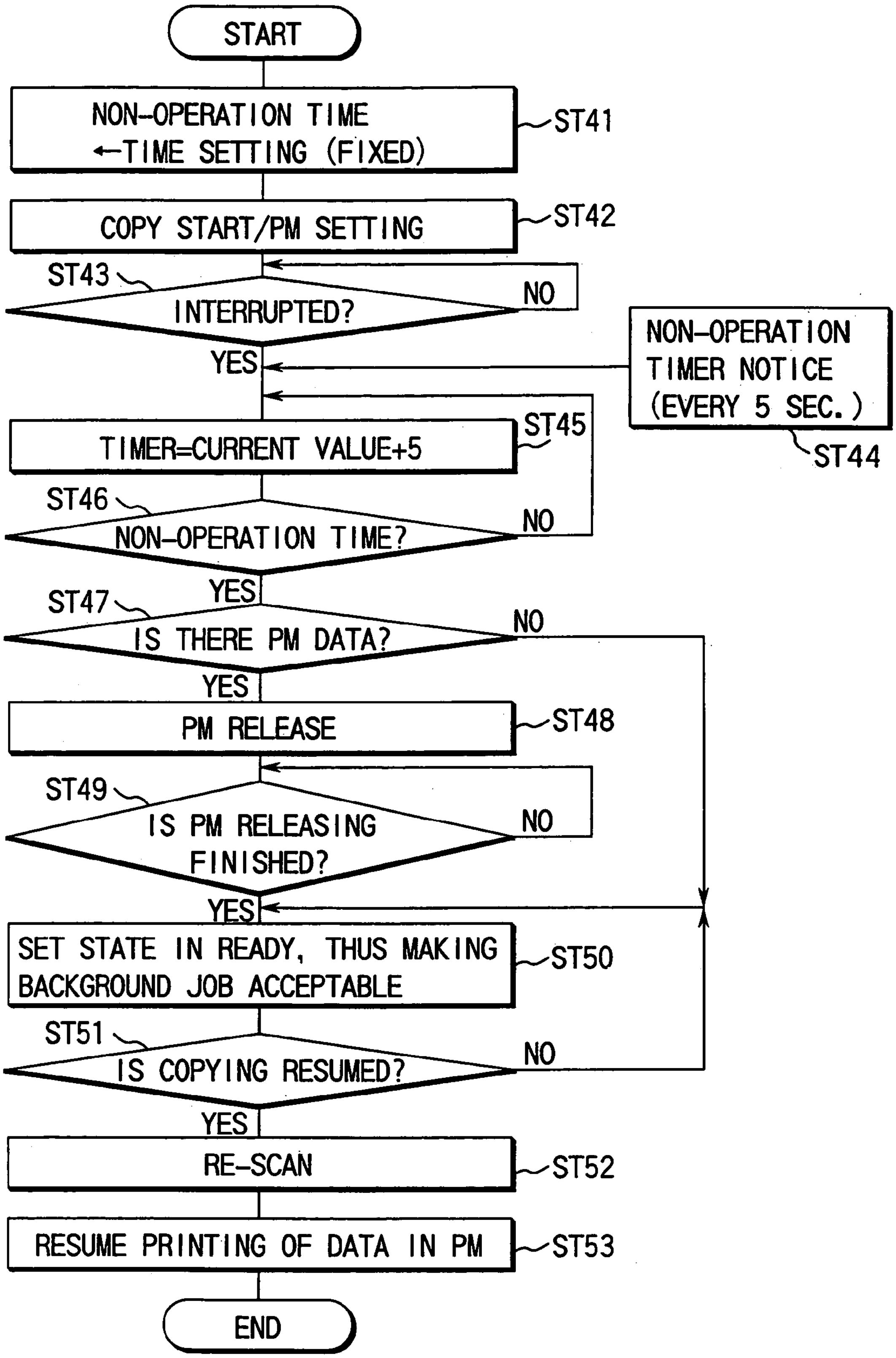
FIG. 9 is a flow chart illustrating a control operation in a case where a non-operation timer has operated.

Referring to a flow chart of FIG. 9, a description will now be given of a control operation in a case where the non-operation timer in the digital copying machine has operated.

A non-operation time is set in the timer memory 108 (ST41).

The system CPU 100 starts the copying operation and sets a storage area in the page memory 323 (ST42). When the copying operation has been suspended by the depression of the clear/stop key 103, etc. (ST43), the system CPU 100 notifies the timer 112 at every five seconds in the non-operation state (ST44) and the timer 112 checks in step ST46 whether the non-operation time set in the timer memory 108 has passed at a time of a current value+5 (ST45).

If the timer 112 determines that the non-operation time has passed, the system CPU 100 checks whether there is data in the page memory 323 (ST47). If there is no data, the control goes to step ST50.

If there is data in the page memory 323, the system CPU 100 releases the data in the page memory 323 (ST48, ST49) and sets the operation state at "READY" state in which a background job is acceptable (ST50).

When the copying operation has been resumed (ST51), the system CPU 100 causes the scanner 2 to perform re-scanning and stores data in the page memory 323 (ST52) and resumes the printing of data in the page memory 323 by means of the printer 3 (ST53).

Figure 10:
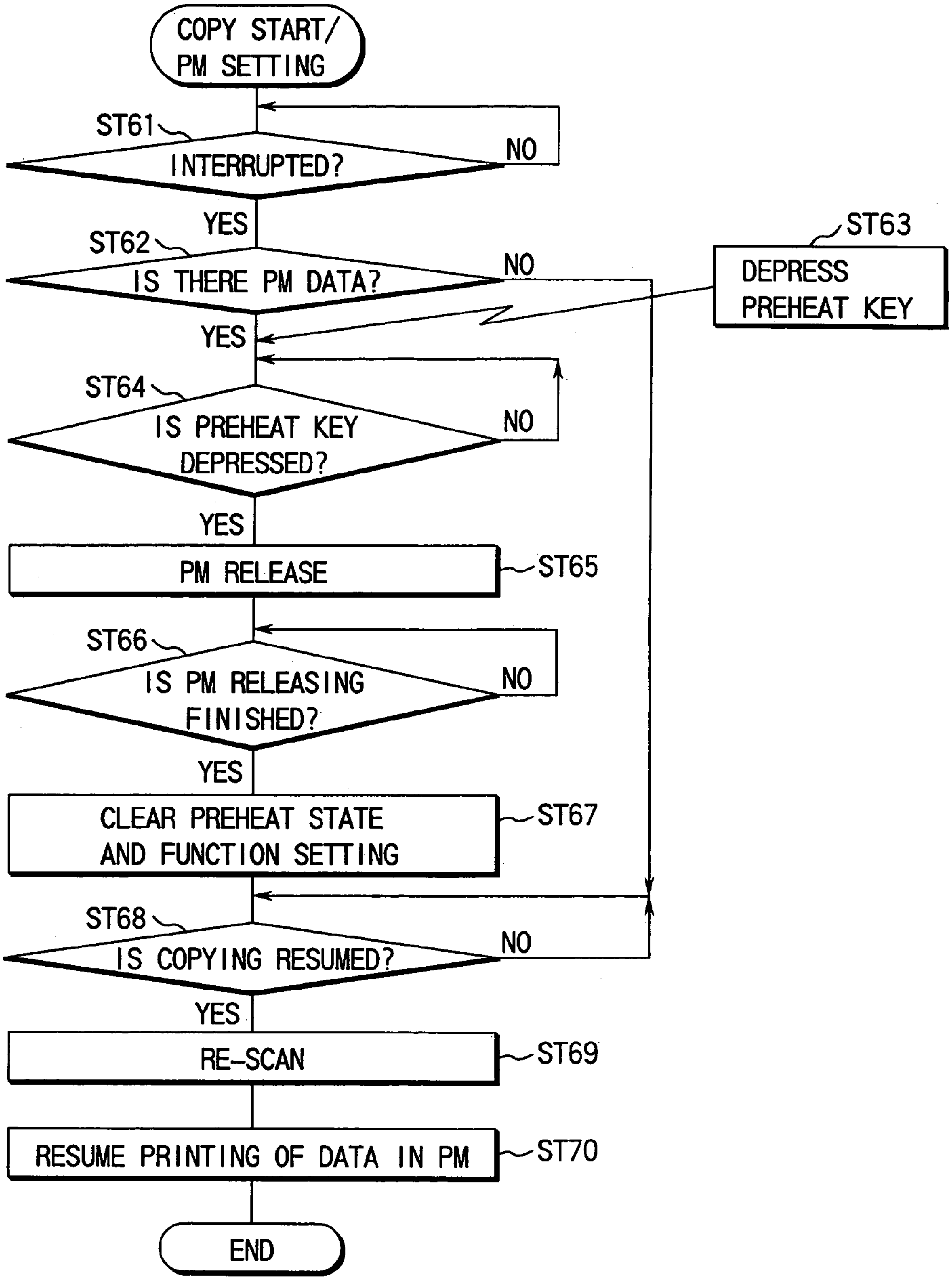
FIG. 10 is a flow chart illustrating a control operation in a case where a preheat key has been depressed.

A control operation in a case where the preheat key 107 of the digital copying machine 1 has been depressed will now be described with reference to a flow chart of FIG. 10.

The copying operation is started and a storage area is set in the page memory 323.

When the clear/stop key 103 has been depressed (ST61), the system CPU 100 checks whether there is data in the page memory 323 (ST62). If there is no data, the control goes to step ST68.

If there is data in the page memory 323, the system CPU 100 releases (ST65, ST66) the data in the page memory 323 at the time the preheat key 107 has been depressed (ST63, ST64), and sets the machine in the preheat state and clears the setting (ST67).

When the copying operation has been resumed (ST68), the system CPU 100 causes the scanner 2 to perform re-scanning and stores data in the page memory 323 (ST69) and resumes the printing of data in the page memory 323 by means of the printer 3 (ST70).

Figure 11:
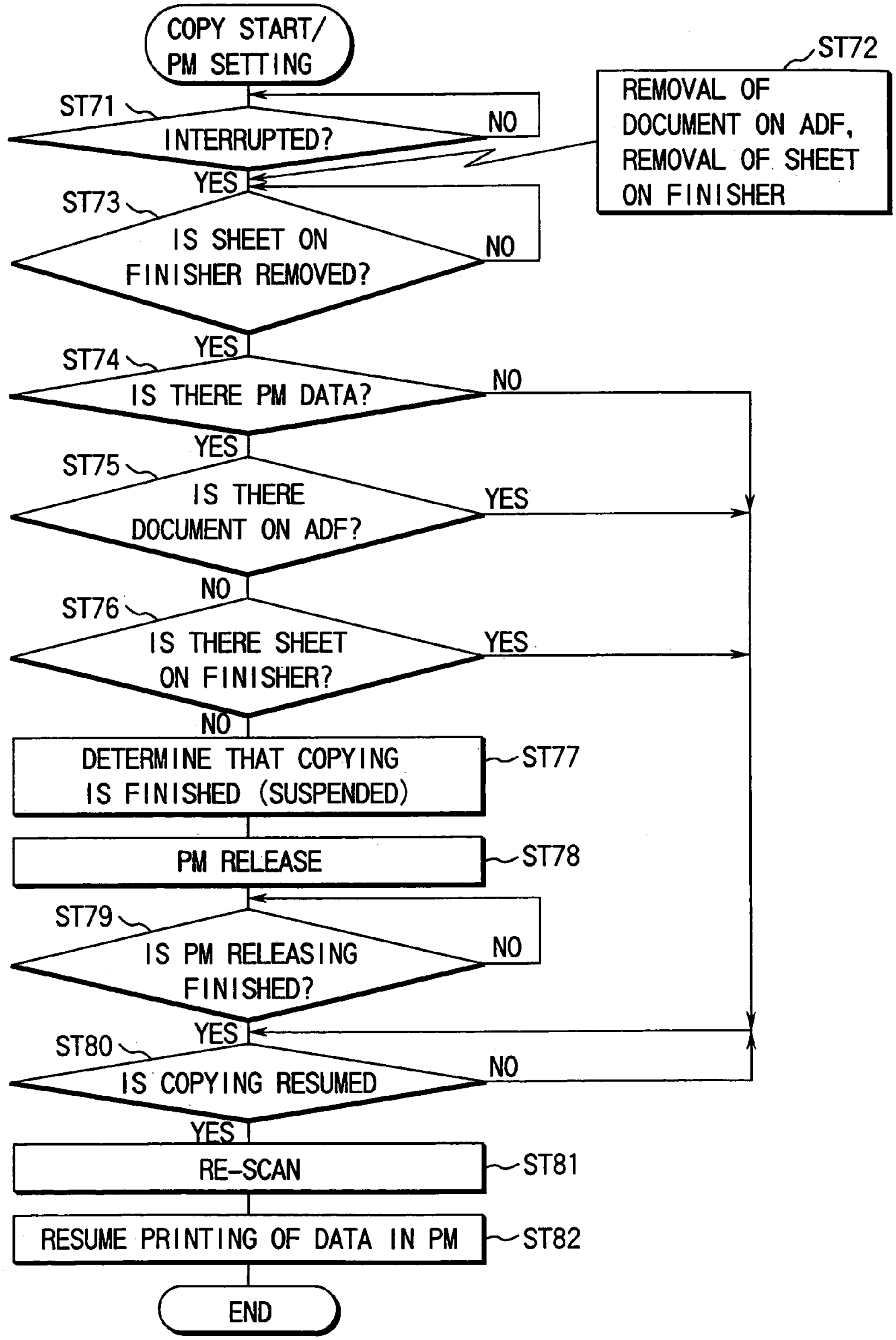
FIG. 11 is a flow chart illustrating a control operation in a case where there is no document on an automatic document feeder and there is no sheet on a finisher.

A control operation in a case where there is no document on the ADF 4 of the digital copying machine 1 and there is no paper sheet on the finisher 126 will now be described with reference to a flow chart of FIG. 11.

The copying operation is started and a storage area is set in the page memory 323.

Where the clear/stop key 103 is depressed and the document on the ADF 4 is removed and also the sheet on the finisher 126 is removed, the system CPU 100 checks (ST74) whether there is data in the page memory 323 at the time the sheet on the finisher 126 has been removed (ST73). If there is no data, the control goes to step ST80.

If there is data in the page memory 323, the system CPU 100 checks whether there is a document on the ADF 4 (ST75). If there is a document, the control goes to step ST80.

If there is no document on the ADF 4, the system CPU 100 checks whether there is a sheet on the finisher 126 (ST76). If there is a sheet, the control goes to step ST80.

If there is no sheet on the finisher 126, the system CPU 100 determines that the copying operation has been finished (suspended) (ST77) and releases the data in the page memory 323 (ST78, ST79).

When the copying operation has been resumed (ST80), the system CPU 100 causes the scanner 2 to perform re-scanning and stores data in the page memory 323 (ST81) and resumes the printing of data in the page memory 323 by means of the printer 3 (ST82).

Figure 12:
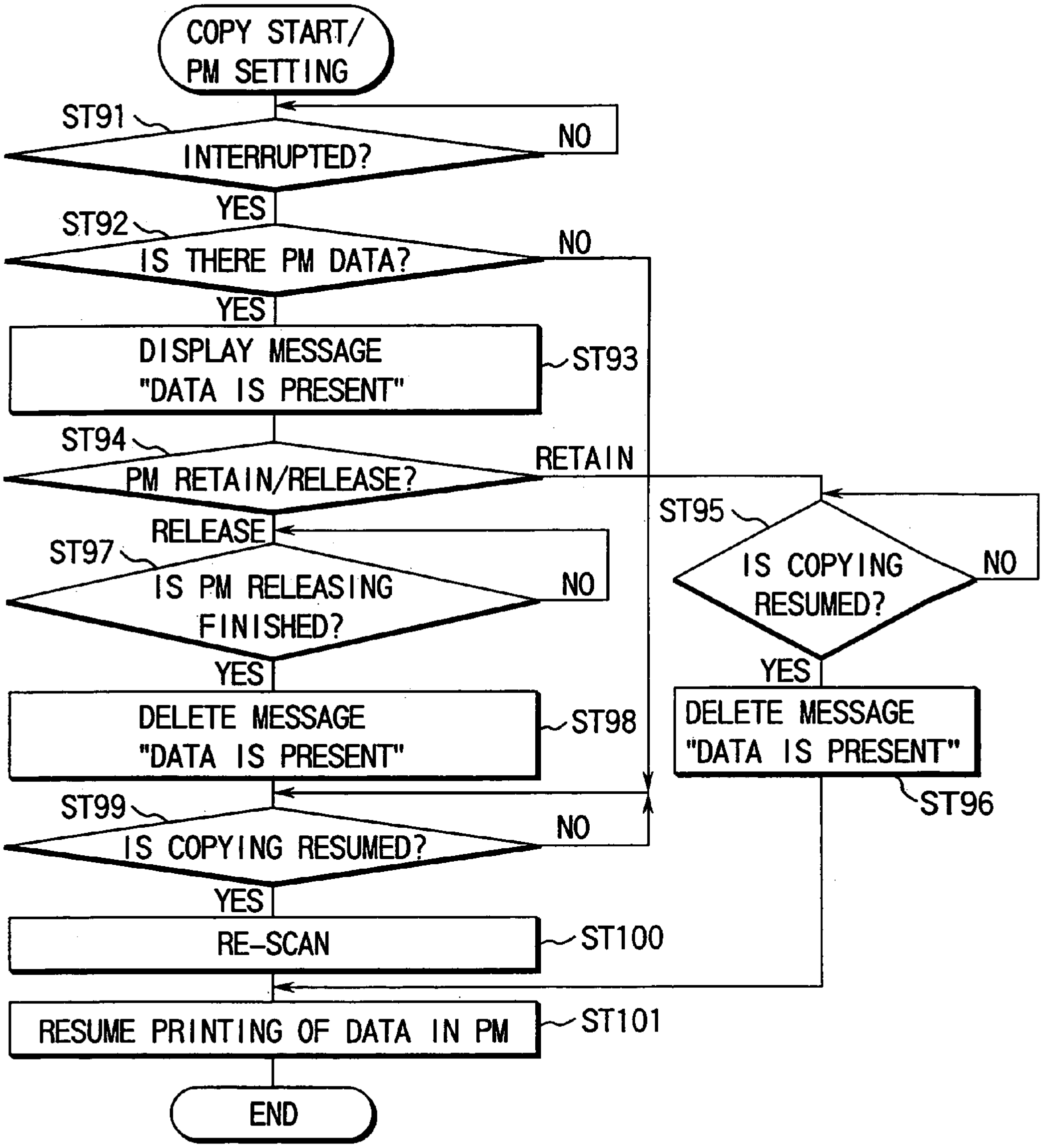
FIG. 12 is a flow chart illustrating control operations for displaying an alarm and deleting a message in a case where there is data in a page memory.

Referring now to a flow chart of FIG. 12, a description will now be given of a control operation for alarm display and message deletion in a case where there is data in the page memory 323 of the digital copying machine 1.

The copying operation is started and a storage area is set in the page memory 323.

Where the clear/stop key 103 is depressed (ST91), the system CPU 100 checks whether there is data in the page memory 323 (ST92). If there is no data, the control goes to step ST99.

If there is data in the page memory 323, the system CPU 100 displays "DATA IS PRESENT IN PAGE MEMORY" on the message display 93 as well as a selection screen for prompting the user to decide whether the data in the page memory 323 should be retained or released (ST93, ST94).

Where the user selected and depressed "HOLD" on the message display 93, the system CPU 100 deletes the message "DATA IS PRESENT IN PAGE MEMORY" on the message display 93 (step ST96) at the time the setting has been changed and the copying operation has been resumed (ST95). The control then goes to step ST101.

On the other hand, where the user selected and depressed "RELEASE" on the message display 93, the system CPU 100 releases the data in the page memory 323 (ST97) and deletes the message "DATA IS PRESENT IN PAGE MEMORY" on the message display 93 (step ST98). When the copying operation has been resumed, the system CPU 100 causes the scanner 2 to perform re-scanning and stores data in the page memory 323. The control then goes to step ST101 (ST100).

In step ST101, the system CPU 100 causes the printer 3 to resume the printing of data in the page memory 323.

As has been described above, according to the embodiments of the present invention, when the user has suspended a job and performed some operation/re-setting, the change of the setting intended by the user can be smoothly effected at the time of resuming the job even if image data is retained on the page memory.

In addition, when the user has suspended a job and performed some operation/re-setting, even if image data is retained on the page memory, the memory copying function with high productivity can be performed while the user smoothly perform operations.

Furthermore, since the user is positively notified that there is data in the page memory, security can be provided on information on the user's image formation medium.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An image forming apparatus comprising:

a scanner that reads an image of a document to generate image data;

a memory that stores said image data read by the scanner;

an image forming unit that forms an image using the image data stored in the memory;

an interrupt mechanism that interrupts an image forming operation;

a timer that measures elapsed time; and a control unit operative to erase the image data stored in the memory after the interrupt mechanism has interrupted the image forming operation and the elapsed time exceeds a predetermined time, wherein said control unit is operative to hold the image data stored in the memory until the image data has been erased.

2. An image forming apparatus according to claim 1, wherein said control unit comprises a first control device operative to erase the image data stored in the memory after the interrupt mechanism has interrupted the image forming operation and the elapsed time exceeds a predetermined time, and a second control device operative to hold the image data stored in the memory until the image data has been erased.

3. An image forming apparatus comprising:

a scanner that reads an image of a document to generate image data;

a memory that stores said image data read by the scanner;

an image forming unit that forms an image using the image data stored in the memory;

an interrupt mechanism that interrupts an image forming operation; and a controller configured to erase the image data stored in the memory if the interrupt mechanism has interrupted the image forming operation and at least one of the following events occurs: (a) a predetermined time elapses, or (b) a function clear key is depressed.

4. The image forming apparatus according to claim 3, further comprising a timer that measures time, and wherein the controller is configured to erase the image data stored in the memory after the interrupt mechanism has interrupted the image forming operation and the elapsed time measured by the timer exceeds the predetermined time.

5. The image forming apparatus according to claim 4, further comprising a function clear key to clear the series of image forming operations, and wherein the controller is configured to erase the image data stored in the memory after the interrupt mechanism has interrupted the image forming operation and the function clear key has been activated.

6. The image forming apparatus according to claim 4, wherein the controller is configured to cause the image forming apparatus to indicate a ready state to scan another document after the image data stored in the memory has been erased.

7. The image forming apparatus according to claim 5, wherein the controller is further configured to hold the image data in the memory until the controller erases the image data.

8. A process for forming an image of a document comprising:

initiating an image forming process, which comprises reading an image of the document to form image data, storing the image data in a memory, and forming an image using the image data stored in the memory;

interrupting the image forming process;

measuring elapsed time;

detecting whether a cancel signal has been received after interrupting the image forming process; and erasing the image data stored in the memory after interrupting the image forming process and at least one of (a) the measured elapsed time exceeds a predetermined time, or (b) the cancel signal is received, wherein the step of erasing the image data stored in the memory is done after interrupting the image forming process and the measured elapsed time exceeds a predetermined time.

9. An image forming process according to claim 8, wherein, after the step of erasing the image data stored in the memory, indicating a ready state to scan another document.

* * * * *